Sept. 26, 1933.  E. D. SHUMWAY  1,928,397
PROCESS FOR PRODUCING ANTIRACHITICALLY
ACTIVATED CEREALS AND CEREAL PRODUCTS
Filed April 13, 1929
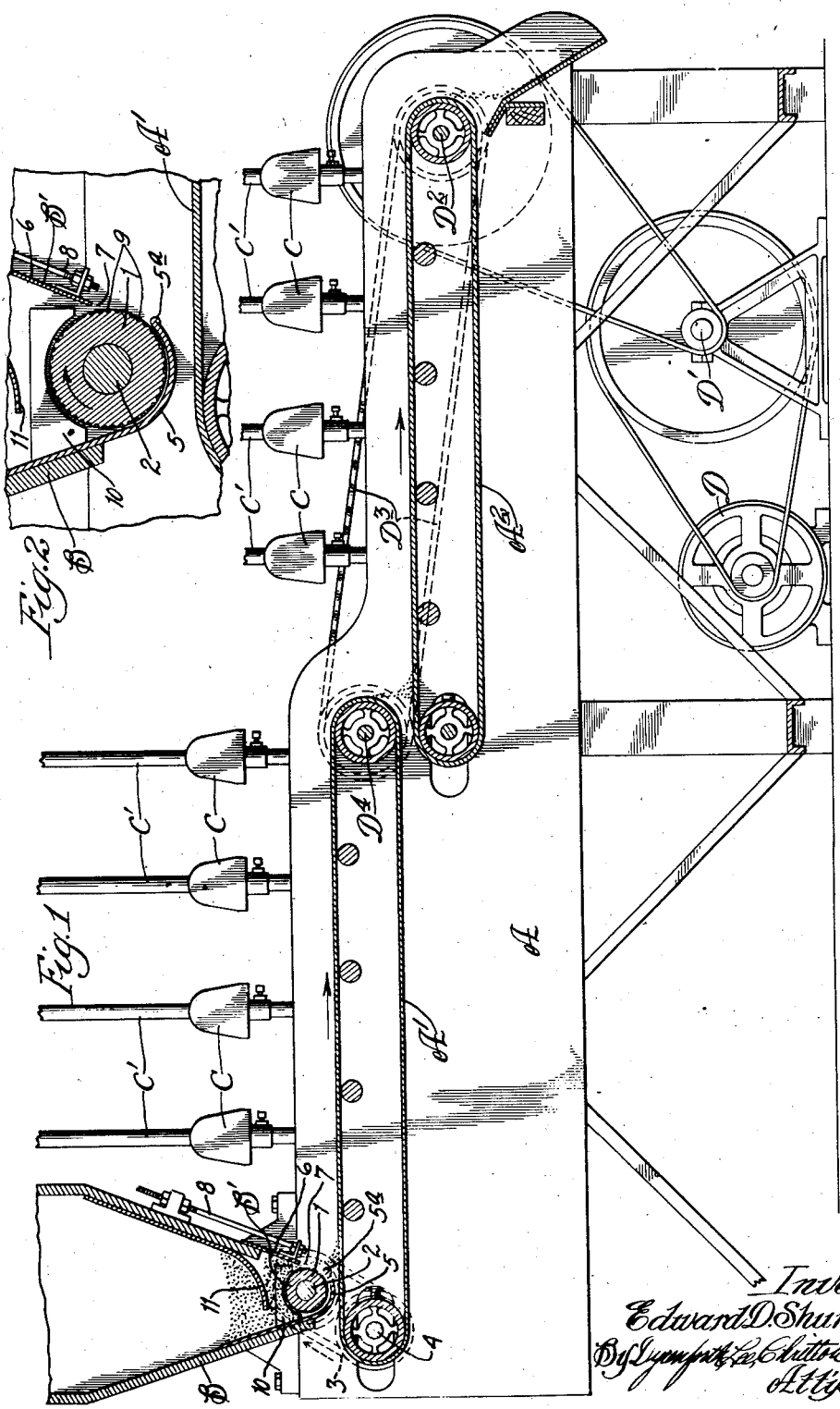

Patented Sept. 26, 1933

1,928,397

UNITED STATES PATENT OFFICE 1,928,397

PROCESS FOR PRODUCING ANTIRACHITICALLY ACTIVATED CEREALS AND CEREAL PRODUCTS

Edward D. Shumway, Lake Forest, Ill., assignor to The Quaker Oats Company, Chicago, Ill., a corporation of New Jersey Application April 13, 1929. Serial No. 354,933

4 Claims. (Cl. 99—11)

This invention relates particularly to the antirachitic activation of cereals and cereal products; and the primary object is to provide an effective and economical method of producing antirachitically activated cereal products.

A further object is to provide apparatus suitable for the economical production of such products.

An important purpose of the invention is to make available for general use antirachitically activated cereal products, such as rolled oats, muffets, farina, various other breakfast foods prepared from wheat, corn meal, etc.

Breakfast cereals and breakfast foods of the general character stated may be prepared from various cereals, including corn, wheat, oats, rye, barley and rice.

I have discovered that by appropriate treatment the cereals can be antirachitically activated in an extremely short period of time, thus enabling large outputs to be produced economically; and I have discovered that, generally, the antirachitically activated cereals may be subjected to various steps in processing, such as steaming, cooking, puffing, shredding, forming, baking, and/or toasting, etc., without destroying the potency of the antirachitic factor (vitamin D). In some cases, I have found it best to effect the activation at a certain stage in the processing of the cereal in which it is best adapted, because of the physical condition, to receive the antirachitic activation.

Generally, it is desirable to effect the activation of the cereal at a stage in the preparation of the product when the cereal is not in pulverulent condition and when it is practically free from dust of any kind.

It is not practically economical, for example, to effect the activation of flour, as such; for, notwithstanding the fact that the material is in an exceedingly fine state of subdivision and might therefore be assumed to be in the best condition to receive activation, I have found that it is not possible to secure uniform activation when the material is in such condition, and, moreover, that real economical activation cannot be effected when the material is in such condition. One reason for this, apparently, is that the minute particles on the surface blanket the particles which are beneath and prevent them from receiving the activation; and another reason is that the pulverulent material, or dust, will cloud the quartz glass (or the window), or reflectors, if used, and thus uniformity of results and rapidity of activation are rendered impossible.

In accordance with the present process, the cereal to be treated is kept in such condition as to avoid the presence of pulverulent material, dust, etc. Wheat, for example, may be cleaned and scoured, then activated, and then subjected to any of the various processes, such as suggested above, for producing the food in its desired form. This is true, generally, of the cereals; but where the cereal has a distinct husk, or skin, which it is desirable to remove, as in the case of oats, the husk should be removed before activation. Thus the groat, before the kernel is subjected to any rolling or crushing operation which might create dust or powder, can be very quickly activated; and the groat may then be steamed and rolled, or flaked, as desired.

The cereal may be cut into pieces, or reduced to granular form, if desired, and may then be activated. For example, middlings from wheat may be treated thus, and grits from corn may be treated in the same way. Afterwards, these materials may be reduced to flour, if desired.

The activation may be effected by means of apparatus well adapted to handle the material in one of the forms suggested above, such apparatus being illustrated in the accompanying drawing, in which—

Fig. 1 is a broken longitudinal sectional view of apparatus adapted to effect activation; and Fig. 2 is an enlarged broken sectional view showing the detail of a feed device employed which is adapted to give a measured feed of the material to be activated.

In the illustration given, A designates a frame in which is mounted a series of belt conveyors (shown as two in number), designated A and $A^2$; B designates a hopper equipped with a feed device B' for giving measured feed to the conveyors; and C designates a series of quartz mercury vapor lamps adjustably mounted on standards C' at one side of the frame, these lamps projecting over the conveyor belts and adapted to flood with ultraviolet rays the material conveyed by the belts.

The conveyor belts are shown arranged in stepped relation, the first being in a plane above the second conveyor. In practice, any desired number of conveyors arranged in stepped relation may be employed and may be driven at such speed as to carry the material under a series of lamps at a high rate of speed, the time for the passage being sufficient, however, to effect the desired activation. For illustration, it has been found that operating in accordance with the ciently activated by exposure for a very short time, say a period of from ten seconds to thirty seconds. In the treatment of oat groats, exposure under the conditions hereinafter stated for a period of fifteen seconds has been found quite satisfactory. In the case of wheat for muffets, farina, etc., it is preferred to give a treatment of about thirty seconds. The conveyors may be so arranged and operated as to carry the material undergoing irradiation through any practical range of space within the time limit employed, as, for example, through a space of from one hundred feet to several hundred feet within a period of fifteen seconds.

Describing further the apparatus illustrated, the conveyors are driven by an electric motor D belted to a countershaft D' which, in turn, is belted to the rear shaft D² of the rear conveyor A². The shaft D² is connected by a sprocket-chain D³ with the rear shaft D⁴ of the first conveyor A'. Obviously, the speed may be varied either by varying the speed of the motor, or by varying the ratio of the gears or pulleys employed.

The lower end of the hopper B is disposed over the front end of the conveyor A'. The reduced lower end of the hopper is equipped with the feed mechanism B'. This comprises a roll 1 mounted on a shaft 2 which is connected by a sprocket-chain 3 to the front shaft 4 of the conveyor A'.

The roll B' is of a length corresponding with the width of the conveyor belt. This roll is disposed above a sheet-metal shell 5 which forms a bottom for the hopper, the member 5 having an edge 5ᵃ which cooperates with the lower edge of an adjustable plate 6 and thus provides an adjustable space 7 through which the cereal may be delivered to the first conveyor belt. The plate 6 is shown adjustable by means of a screw-rod 8.

The surface of the roll is provided with longitudinal recesses 9 which afford shallow chambers adapted to receive the cereal and deliver a measured quantity to the first conveyor belt, the amount of cereal fed to the belt being further regulable by adjustment of the plate 6. The radii of the sprocket-wheels of the chain 3 may be varied to vary the speed of rotation of the roll 1 with relation to the speed of travel of the conveyor belts.

The end-portions of the roll 1 are covered by blocks 10 which may extend three or four inches from the lateral walls of the hopper. It is not intended that the material shall be fed to the marginal edge-portions of the conveyor belt. It is preferred to leave a few inches at each edge of the belt to which the cereal is not fed. The hopper is shown equipped at its bottom with a curved deflector 11 which projects over the roll from the rear side of the hopper, so that the material cannot drop directly into the space 7, but rather is carried over to the discharge-opening by the roll 1.

The time necessary for irradiation may vary greatly, depending upon the strength of the lamps and their position of adjustment with relation to the belt. It is preferred to set the lamps, which are shown adjustable, about nine inches above the surface of the conveyor belt. The lamp is elevated so that it extends crosswise of the conveyor belt. Each lamp may cast rays over a span of about thirty-six inches, for example, the belt being about forty inches wide, there being a little empty space at each edge of the belt. The type of lamp employed preferably is No. 220 A. X. S. K. 171 Cooper Hewitt quartz mercury lamp, operating on 220 volt direct current and employing about 2.5 amperes. Under the conditions stated, assuming about a half pound of material (oat groats, or wheat, for example) per square foot of belt surface, an exposure of ten seconds to thirty or forty seconds ordinarily is sufficient. Fifteen seconds is preferred for oat groats and about thirty seconds for wheat.

Further examples of treatment in producing foods from wheat are, as follows:

Muffets

In the manufacture of muffets, the preferred method is to clean the wheat by passing it over air separators, sieves, and through scourers to remove foreign grains, weed seeds, and any dirt or foreign material adhering to the surface of the grain; then cook the cleansed wheat by boiling in water at 212° F. for about three-quarters of an hour; then to pass the cooked wheat through coolers adapted to cool the material down to room temperature; then to pass the wheat into tempering tanks, or bins, where the material remains for three or four hours, allowing the moisture to be more uniformly distributed in the kernel; and then to activate the material, as by feeding it, in thinly spread condition, by means of a conveyor beneath a battery of quartz mercury vapor lamps. Finally, the activated wet wheat may be squeezed into ribbons; these ribbons may be cut into suitable lengths, and may then be rolled into biscuits; and the biscuits thus produced may be put through a toasting oven at a temperature of 550° F.; and finally the toasted biscuits pass into a drying oven where they are dried at a temperature of 300° F. The whole toasting and drying process may require approximately one hour.

After the cooked wheat leaves the tempering tank, it contains about fifty percent moisture and is swollen to twice its original size. The germ also is swollen so that it seems to receive the activation from the ultra violet rays more readily than in its natural state. Accordingly, the activation may be expeditiously accomplished, giving a high antirachitic potency. Another feature of importance is that there is absolutely no dust to contend with at this stage of the process; and it has been found that the subsequent toasting and drying processes do not diminish the potency of the antirachitic principle resulting from the ultra violet light treatment.

Another breakfast food

Cleaned wheat is antirachitically activated in the manner set forth above; then is rather coarsely cut, for example, each kernel into three pieces; then steamed to heat and soften the material, say at about fifteen pounds steam pressure for two minutes; then passed through rolls and squeezed into small flakes. The treatment subsequent to the activating operation does not reduce the potency of the antirachitic factor. Indeed, the subsequent steps of the process have the advantage of aerating the wheat and eliminating any ozone odor which it may have acquired from the lamps.

Puffed wheat

Cleaned and secured wheat is put through a process known as pearling; this product is then antirachitically activated in the manner set forth above; the wheat is then placed in closed tubes, or so-called guns; heated in an oven at a temperature of about 550° F. for approximately forty minutes; then subjected to super-heated steam at a pressure of 175 pounds for about three minutes; and the guns are then removed from the oven and discharged (allowed to pop) which produces a puffing of the wheat. The processing subsequent to the irradiation does not diminish the potency of the antirachitic factor. There is a great advantage in treating the material before the puffing operation. Treatment subsequent to the puffing operation would require much more bulky and expensive equipment. Moreover, the product is very tender, and any extra handling after puffing would tend to break up the product and render it unmarketable.

Farina

This is produced from a certain middling product of wheat, a middling which is commonly used for producing patent flour. The middlings which are distinctly granular and free from pulverulent material are passed by means of a conveyor under a battery of lamps and antirachitically activated in the manner set forth above. The activated farina is then subjected to the action of dry heat in such manner as to effect sterilization. The product is packed while warm. The treatment subsequent to activation does not in any way lessen the antirachitic potency.

If desired, the activated middling may be reduced to flour and will still retain its antirachitic potency. It has been found that the heat and attrition developed by grinding flour does not in any way lessen the antirachitic potency.

Corn and other cereals

It has been found that the other cereals mentioned may be antirachitically activated and subjected to subsequent processing operations without destroying the potency of the antirachitic principle. In the case of corn, the bran may be removed, if desired, and the kernel may then be activated. The kernels may then be steamed and rolled into flakes; or the kernels may be coarse-broken, steamed and rolled into flakes. If preferred, grits from corn which are distinctly granular in character may be activated in the manner set forth above. Such grits may be reduced to flour, or may be used as coarse corn meal, if desired. The activated grits may be cooked, toasted, or treated by methods similar to those described above without destroying the antirachitic principle.

The other cereals mentioned may, if desired, be treated in accordance with the methods set forth above. Thus, puffed cereals of various kinds, such as puffed rice containing vitamin D, may be produced by irradiation followed by treatments corresponding with those employed in producing puffed wheat.

The invention enables activated cereals and cereal products to be produced in uniformly activated condition and at a high rate of production. These features are obviously of great importance in a field where a very large output at small cost per unit is essential, and where the value resulting to the public from the antirachitic treatment necessarily depends upon the manufacturer's ability to control the factors which will give a substantially uniform result.

Ordinarily, it will be unnecessary to employ an exposure of more than thirty or forty seconds. Longer exposure will not injure the product or destroy the antirachitic factor produced by the short treatment. There may be rare instances where it will be desirable to increase the period of exposure, but experience shows that prolongation of the treatment beyond five minutes, or even beyond two minutes, is wholly unnecessary, assuming lamps of the right power and placed to best advantage to be employed. If a weaker lamp is employed, or if the distance is increased, the time of exposure necessarily will be increased.

Other means for producing ultraviolet rays may be employed. For example, carbon arc lamps may be employed as a source of the rays.

It may be noted further with reference to the apparatus employed that the material, as it drops from each conveyor onto the succeeding conveyor is agitated and to a large extent overturned, so that fresh surfaces are presented to the rays from the next group of lamps.

The improved apparatus may be effectively used for antirachitically activating feed for chickens, cattle, and other stock. For this purpose, grains, cereals, seeds, peas, beans, etc. may be carried, in measured quantities, by the conveyors under a battery of ultraviolet lamps and subjected to irradiation for the requisite period of time, the number of lamps, the intensity of the lamps, the distance of the lamps from the conveyors, and the rate of speed of the conveyors being appropriately regulated to effect the desired result.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A process of producing an antirachitically activated cereal which comprises: removing the husk or skin from the cereal; removing pulverulent material from the cereal; and subjecting the whole cereal kernel, thus prepared, to the action of rays adapted to antirachitically activate the kernels.

2. Subjecting to a milling operation a product prepared in accordance with the process stated in claim 1.

3. A process of producing an antirachitically activated cereal product which comprises: removing the husk or skin from the cereal, comminuting the kernels and removing the pulverulent material; and subjecting the comminuted material, in the absence of such pulverulent material, to the action of ultra-violet rays and thereby anti-rachitically activating said comminuted material.

4. The process of producing antirachitically activated food from oats which comprises: removing the husks from the oats; removing pulverulent material from the groats; then irradiating the groats with ultra-violet rays and thus antirachitically activating them; and then subjecting the activated groats to the action of heat.

EDWARD D. SHUMWAY.